United States Patent [19]

Bay

[11] 4,382,212

[45] May 3, 1983

[54] ONE LAMP OUT DETECT SHUTDOWN TECHNIQUE FOR HIGH FREQUENCY, SOLID STATE FLUORESCENT LAMP BALLASTS

[75] Inventor: David L. Bay, Muncy, Pa.

[73] Assignee: GTE Products Corporation, Stamford, Conn.

[21] Appl. No.: 232,608

[22] Filed: Feb. 9, 1981

[51] Int. Cl.³ .......................................... H05B 41/29
[52] U.S. Cl. .................................. 315/225; 315/106; 315/220; 315/277; 315/DIG. 7
[58] Field of Search ............ 315/106, 119, 121, 209 R, 315/210, 219, 224, 225, 277, DIG. 7, 220; 363/56, 64; 331/62

[56] References Cited

U.S. PATENT DOCUMENTS 4,127,795 11/1978 Knoll ........................... 315/DIG. 7

Primary Examiner—Eugene R. La Roche
Attorney, Agent, or Firm—John A. Odozynski

[57] ABSTRACT

An improved output configuration for a multiple-lamp electronic ballast system. The output includes a differential transformer having a primary adapted to be coupled in a first loop including a first filament filament drive winding and feedback winding and a secondary adapted to be coupled in a second loop that includes a second filament, filament drive winding and feedback winding.

The improvement allows the entire ballast to be shut down when a lamp has been removed thereby avoiding aberrant oscillator operation under abnormal, yet predictable, lamp load conditions.

9 Claims, 1 Drawing Figure

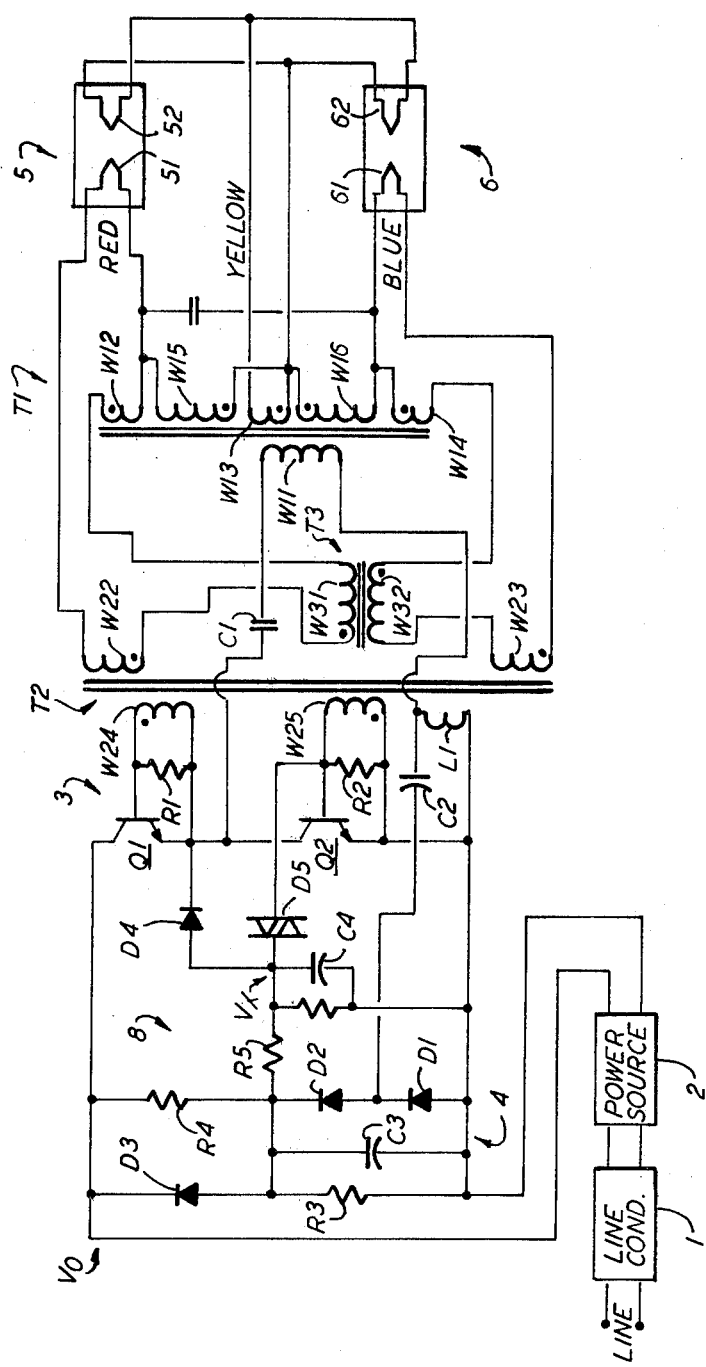

ONE LAMP OUT DETECT SHUTDOWN TECHNIQUE FOR HIGH FREQUENCY, SOLID STATE FLUORESCENT LAMP BALLASTS

TECHNICAL FIELD

This invention relates to electronic ballast circuitry and more particularly to transformer output configuration including a differential transformer for shutting down the ballast circuit when one of a plurality of lamps has been removed from the system.

BACKGROUND ART

U.S. Pat. No. 4,188,661, "Direct Drive Ballast With Starting Circuit" by Bruce L. Bower and Raymond H. Kohler, dated Feb. 12, 1980 and assigned to the assignee of the present invention, and hereby incorporated by reference, describes an electronic ballast circuit for driving a pair of fluorescent lamps. Central to the operation of that circuit is a high frequency (20 to 30 KHz) inverter comprising two transistors connected in series and operating in a push-pull mode. The inverter drives, via an output transformer, the cathode filaments of the lamps. The output transformer comprises a series-resonant primary winding coupled to the inverter output. The secondary of the output transformer includes one lamp voltage winding and three filament windings. Two filament windings separately supply current to one filament of each of the lamps. The third filament winding supplies current to the remaining two parallel-connected filaments. Also included on the secondary of the output transformer is a series connected discrete ballasting inductor in series with a pair of bias windings oppositely poled and connected in series between the first and second filament windings. These windings are arranged so as to establish a voltage differential across the cathodes of the respective lamps sufficient to effect firing of the lamps.

The ballast circuit further includes an interstage transformer having three primary windings each coupled in a loop that includes at least one lamp filament and a lamp filament winding. The secondary of the interstage transformer includes a pair of oppositely-poled base drive windings coupled to the push-pull inputs of the inverter. Because the primary windings are coupled in a loop that includes the lamp filaments, they induce a voltage of the secondary proportional to the sum of filament currents. Proper phasing of the secondary windings provides the positive feedback necessary to sustain inverter operation. (A modified feedback arrangement disclosing a single primary winding connected in a loop with the two parallel-connected filaments is disclosed in U.S. Pat. No. 4,127,893, "Tuned Oscillator Ballast Circuit With Transient Compensating Means" by Charles A. Goepel and assigned to the assignee of the present invention. See FIG. 2 of that patent).

U.S. Pat. No. 4,188,661 also discloses circuitry for enhancing the oscillator startup operation. Upon initial energization of the ballast circuit, a capacitor connected in parallel with one of the secondaries of the interstage transformer is slowly charged through a source of slowly developed DC voltage. When the charge across the diode reaches a given magnitude, a series connected diac is switched on thereby discharging the capacitor through a relatively low impedance and causing a transient across the primary of the interstage transformer. This perturbation supplies base drive to at least one of the inverter transistors and assures oscillator startup. A voltage derived from the current in the primary of the output is rectified and applied to the diac in a manner that renders the diac nonconducting during steady state operation of the ballast circuit.

While it cannot be gain said that the circuitry disclosed in the patent discussed above represents a substantial advance in the state of the art of ballast design, with regard to both the conventional electromagnetic and the electronic types, the subject invention represents a further substantial advance in that art. In particular the improved output transformer configuration disclosed herein provides, inter alia, improved reliability and safety by shutting down the entire system when one lamp has been removed or burned out.

DISCLOSURE OF THE INVENTION

The above and other objects and advantages are achieved in one aspect of this invention by an improved electronic ballast system including an inverter circuit for driving a load circuit comprising at least a pair of lamp filaments. The inverter operation is dependent on a feedback signal derived from a lamp filament current. The improvement comprises shutdown means for detecting the removal of at least one lamp filament and for inhibiting the operation of the inverter in response thereto.

More narrowly, in a ballast system the feedback signal is provided by a pair of feedback windings each adapted to provide a feedback signal derived from a lamp filament current, the shutdown means may take the form of a differential transformer having a first winding coupled to one feedback winding and a second, oppositely-poled, winding coupled to the other feedback winding.

The shutdown technique avoids inverter instability phenomena that may take place under abnormal, although predictable, load conditions.

BRIEF DESCRIPTION OF THE DRAWINGS

The sole drawing is a schematic diagram of an electronic ballast circuit employing the subject invention.

DESCRIPTION OF THE PREFERRED EMBODIMENT

For a better understanding of the present invention, together with the objects, advantages and capabilities thereof, refer to the following disclosure and appended claims in conjunction with the accompanying drawing.

Referring now to the drawing, the electronic ballast circuit derives its primary power from the AC line through a line conditioner 1. The line conditioner may include, inter alia, a transient suppressor, overload switch and line filter. See, e.g., U.S. Pat. No. 4,188,661, supra, at column 2, lines 38–48, column 3, lines 36–52, and as illustrated in the drawing as element 5. The output of the line conditioner is coupled to the input of a voltage supply 2 which provides a nominal output voltage of approximately 300 volts.

The core of the electronic ballast system illustrated in the drawing is the high frequency, push-pull inverter 3 comprising NPN transistors Q1 and Q2. Q1 has a collector connected to the high side of the voltage supply and an emitter connected to the collector of Q2; the emitter of Q2 is in turn connected to the common or ground return of the voltage supply. The base-to-emitter junctions of both Q1 and Q2 are individually coupled by damping resistors, R1 and R2, respectively. The output of inverter 3, that is, the signal at the junction of Q1 emitter and Q2 collector, is coupled through a capacitor C1 to one side of the primary winding, W11, of output transformer T1. A detailed discussion of the construction and operation of T2 is presented below. The other side of W11 is coupled to the input of what, for present purposes, will be considered a secondary voltage source 4.

Voltage source 4 includes an inductance L1 connected between W11 and the common return. The function of W11 and L1 is coupled through capacitor C2 to a voltage-doubling peak rectifier that includes diodes D1 and D2, capacitor C3, and resistor R3. D1 has a cathode connected to one side of C3; the other side of C3 is connected to the common return. R3 is connected in parallel with C3. The output of the secondary voltage source 4 is coupled through a diode D3, in the anode-to-cathode direction, to the high side of the primary voltage source 2.

Operation of voltage supply 4 is contingent on the operation of the inverter circuit in the following manner. When operating, the inverter develops approximately a 20 KHz square wave at the junction of Q1 and Q2. (The frequency of the output signal is largely determined by the resonant frequency of C1 and W11.) The current flowing in W11 is coupled to the common return through L1, thereby developing a periodic voltage across L1 in proportion to that current. The voltage is coupled through C1 to rectifying diodes D1 and D2. In standard fashion the charge stored in C3 will represent a voltage substantially equal to the peak-to-peak voltage across L1, less losses attributable to the rectification process. Normally the voltage developed by the secondary source 4 will be less than that developed by the primary source 2 so that D3 will be reverse biased, the two sources isolated from each other, and negligible current will be drawn from the secondary source. However, under low-line or other aberrant conditions, the voltage at the output of source 2 may drop so significantly that D3 will become forward biased and the secondary source will then be available to power the inverter circuitry.

Startup of the oscillator is assured by a startup circuit 5 that includes a charging resistor R4, a voltage divider, resistors R5 and R6, a clamping circuit, diode D4 and capacitor C4 and a semiconductor switch in the form of diac D5. R5 is coupled from the high side of voltage source 2 to one side of C3 so that, subsequent to the energization of the ballast circuit, C3 begins to charge toward the voltage at the output of that source. (To be precise, it will take some time for output of source 2 to attain its nominal value but this duration can be expected to be de minimis in comparison with the R4C3 time constant). R5 and R6 are series connected across C3, so that the voltage developed at the junction of R5 and R6, ultimately coupled to D5, will track the exponentially-rising voltage across C3. As illustrated in the drawing, D5 has one end coupled to the output of the voltage divider, at the junction of R5 and R6, and the other end coupled to an input of the inverter, at the base of Q2. Neglecting the effect of R3, the voltage, $V_x$, at the output of the voltage divider will increase roughly as $$[R6/(R5+R6)] \times V_o(1-e^{-t/R4C3}).$$

At some time determined by the values of the components represented in that relationship above, $V_x$ will exceed the breakover voltage of D5. D5 will fire, thereby supplying bias current to the base of Q2 and initiating operation of the inverter, after which the inverter will become self-sustaining. The salient advantage of this startup circuit is that startup of the inverter is inhibited until C3 of the secondary voltage source has become charged. As a result the inverter transistors are spared some deleterious effects attendent the initial current surge required to charge C3.

The startup circuit also includes a clamping circuit comprising D4, with a cathode connected to the inverter output and an anode connected to the voltage divider output, and C4, connected from there to ground. The clamping action of D4 and C4 prevents the inverter square wave output from randomly firing D5. In effect, the clamping circuit disables the starting circuit during steady state inverter operation so that Q1 and Q2 are not subjected to transients that might result from the random firing of D5.

As illustrated in the drawing, the output of the inverter is coupled to T1 and drives a pair of fluorescent lamps, 5 and 6, having a RED filament 51, a BLUE filament 61, and YELLOW filaments 52 and 62, respectively. Filament current is supplied by a RED filament winding W12, a YELLOW filament winding W13 and a BLUE filament winding W14, for driving the RED filament, the YELLOW filaments and the BLUE filament, respectively. The filament windings are wound on the secondary of T1 as shown and each is arranged to form a circuit loop with an associated filament or filaments as in the case of W13. W12 forms a loop with filament 51, W14 and filament 61 and W13 with filaments 52 and 62. A first bias winding, W15, on the secondary of T1 has a first end coupled to W12 and a second end coupled to W13; a second bias winding, W16, is similarly connected between W13 and W14. The bias windings, separate the RED and BLUE filament windings, are oppositely poled so as to establish the necessary voltage differential across the lamps 5 and 6.

The necessary feedback to sustain inverter operation is provided by interstage transformer T2. T2 includes equivalently poled primary wound feedback windings, W22 and W23, and oppositely poled secondary wound base drive windings W24 and W25. As shown in the drawing W22 has one end adapted to be coupled to the RED filament and W23 has one end adapted to be coupled to the BLUE filament. Each is arranged to form a circuit loop with respective filaments, filament drive windings and one side of a differential transformer, T3, the operation of which is the subject of this invention as will be discussed below. Because feedback windings W22 and W23 are coupled in a loop with the RED and BLUE filaments respectively, they conduct the same current as do those filaments. They therefore develop a signal that is fed back to W24, coupled across the base-to-emitter junction of Q1, and W25, coupled across the base-to-emitter junction Q2. The feedback and base drive windings are phased in such a manner (as illustrated in the drawing) to provide positive feedback effect required for push-pull operation of the inverter.

Returning now to construction and operation of T3, T3 is a differential transformer, preferably bifilar wound, having a primary winding, W31, and a secondary winding, W32, each comprising approximately 70 turns of #26 wire wound on a Ferroxcube type 813 3/16 inch "double-E" core. W31 has a first end coupled to W22 of T2 and a second end coupled to W12 of T1, the RED filament winding; similarly W32 has a first end coupled to W23 of T2 and a second end coupled to W14 of T1, the BLUE filament winding. Because W31 and W32 of T3 are coupled differentially in loops that include the RED and BLUE filaments respectively, the net series inductance provided by W31 and W32 in those respective circuit loops will approach zero during normal operation. That is, any flux produced in the core of T3 by W31 will be cancelled by the flux produced by W32. This is because of the phases relationship between W31 and W32 and the approximate equality of current flowing in their respective loops.

However, should either the RED or BLUE filament become open, for example by either filament burn out or by physical removal, the flux cancellation in the core of T3 will be upset. For example, should lamp 5 be removed, current will flow only through W32. As a result W32 will present a relatively large effective inductance. Because this inductance is presented in a loop that includes feedback winding W23, the current flowing through W23 will be reduced to a level insufficient to support oscillation and the inverter will be shut down.

As a result, whenever either of the two lamps is withdrawn from operation, the other will be shut down and zero power will be drawn from the ballast power source. This avoids oscillator instability problems that may be experienced during abnormal, albeit predictable, ballast load conditions. Furthermore, the subject invention limits the discharge current flowing from the lamp holder to ground when a lamp is removed from a lamp socket. The technique is a relatively inexpensive, yet reliable, method of detecting the absence of one lamp from the ballast load circuit and, as a consequence, completely shutting down the ballast. This ameliorates instability conditions under abnormal load conditions, thereby improving ballast reliability.

Accordingly, while there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

This invention is useful in electronic ballast systems for fluorescent or other types of lamps.

I claim:

1. In an electronic ballast system for driving at least first and second fluorescent lamps said first lamp having filaments that may be arbitrarily respectively designated RED and YELLOW and said second lamp having filaments respectively designated YELLOW and BLUE, said ballast system including
   A. an inverter;
   B. an output transformer having:
   1. a primary winding coupled to an output of the inverter, and
   2. a secondary including:
      a. a RED filament winding for supplying current to the RED filament;
      b. a BLUE filament winding for supplying current to the BLUE filament;
      c. a YELLOW filament winding for supplying current to the YELLOW filaments;
      d. a first bias winding separating the RED and YELLOW filament windings;
      e. a second bias winding separating the BLUE and YELLOW filament windings, and
   C. an interstage transformer having:
   1. a primary including:
      a. a first feedback winding for developing a feedback signal derived from the RED filament current;
      b. a second feedback winding for developing a feedback signal derived from the BLUE filament current, and
   2. a secondary including at least one drive winding coupled to an inverter input, the improvement comprising a differential transformer having oppositely poled primary and secondary windings wherein said primary winding, said first feedback winding and said RED filament winding are so arranged as to form a first circuit loop with the RED filament and wherein said secondary winding, said second feedback winding and said BLUE filament winding are so arranged as to form a second circuit loop with the BLUE filament.

2. In an electronic ballast system including an inverter circuit for driving at least a pair of lamps, a transformer output configuration comprising:
   a primary coupled to the inverter output, and
   a secondary including:
   a first series connection including a
      first filament winding, a first feedback winding, and a first winding of a differential transformer, said windings adapted to be coupled in a first circuit loop with a first lamp filament and
   a second series connection including a second filament winding, a second feedback winding and a second winding of the differential transformer, said windings adapted to be coupled in a second circuit loop with a second lamp filament whereby removal of at least one of the lamp filaments inhibits operation of the inverter.

3. A transformer output configuration as defined in claim 2 wherein the differential transformer first and second windings comprise approximately 70 turns of #26 wire.

4. A transformer output configuration as defined in claim 3 wherein the first and second windings are oppositely poled.

5. A transformer output configuration as defined in claim 4 wherein the first and second windings are bifilar wound.

6. In an electronic ballast system including an inverter circuit for driving a load circuit comprising at least a pair of lamp filaments, the operation of said inverter being dependent on a feedback signal derived from a lamp filament current, the improvement comprising shutdown means for detecting the removal of at least one lamp filament and for inhibiting the operation of the inverter in response thereto wherein the feedback signal is provided by first and second feedback windings, said first feedback winding adapted to form a first circuit loop with a first lamp filament and said second feedback winding adapted to form a second circuit loop with a second lamp filament and wherein said shutdown means comprises a transformer having a first winding coupled to the first feedback winding and a second winding coupled to the second feedback winding.

7. An improvement as defined in claim 6 wherein the transformer first and second windings are oppositely poled.

8. An improvement as defined in claim 7 wherein the transformer is a differential transformer comprising bifilar wound first and second windings.

9. An improvement as defined in claim 8 wherein said first and second windings comprise approximately 70 turns of #26 wire.

* * * * *